United States Patent
Klein et al.

(10) Patent No.: US 12,328,037 B2
(45) Date of Patent: Jun. 10, 2025

(54) ELECTRICAL MACHINE WITH A MULTIFUNCTIONAL DISC ELEMENT FOR A ROTOR

(71) Applicant: Schaeffler Technologies AG & Co. KG, Herzogenaurach (DE)

(72) Inventors: Tobias Klein, Kippenheim (DE); Steffen Lehmann, Ettlingen (DE); Andreas Trinkenschuh, Buhl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 81 days.

(21) Appl. No.: 17/427,712

(22) PCT Filed: Dec. 4, 2019

(86) PCT No.: PCT/DE2019/101037
§ 371 (c)(1),
(2) Date: Aug. 2, 2021

(87) PCT Pub. No.: WO2020/160715
PCT Pub. Date: Aug. 13, 2020

(65) Prior Publication Data
US 2025/0007344 A1    Jan. 2, 2025

(30) Foreign Application Priority Data
Feb. 7, 2019  (DE) .......................... 102019103007.2

(51) Int. Cl.
*H02K 1/32*  (2006.01)
*H02K 1/16*  (2006.01)
*H02K 7/00*  (2006.01)

(52) U.S. Cl.
CPC ................ *H02K 1/32* (2013.01); *H02K 1/16* (2013.01); *H02K 7/006* (2013.01)

(58) Field of Classification Search
CPC ............. H02K 1/16; H02K 1/28; H02K 7/006
(Continued)

(56) References Cited

U.S. PATENT DOCUMENTS 5,223,757 A  *  6/1993  Staub .................... H02K 9/197
                                                             310/64
8,120,227 B2    2/2012  Leroy et al.
(Continued)

FOREIGN PATENT DOCUMENTS

CN        1836359 B    9/2006
CN      101790833 B    7/2010
(Continued)

OTHER PUBLICATIONS

Pflueger et al., English Machine Translation of DE 10243273 (Year: 2004).*

(Continued)

*Primary Examiner* — Rashad H Johnson
(74) *Attorney, Agent, or Firm* — Volpe Koenig

(57) ABSTRACT

An electric machine (1) for a motor vehicle drive train, having a stator (2), a rotor (3) mounted to rotate relative to the stator (3) and a drive schaft (4) receiving the rotor (3) for conjoint rotation, wherein, in addition to the rotor (3), a disk element (5), also connected to the drive schaft (4) for conjoint rotation and made of sheet metal, is arranged in an axial direction of the drive schaft (4), the disk element (5) having a transmitter contour (6), which can be detected by an eddy current sensor, and a coolant guiding contour (7), for deflecting a coolant stream towards the stator (2), and being pressed with an axial prestressing force against an end face (8) of the rotor (3).

20 Claims, 3 Drawing Sheets

(58) Field of Classification Search
USPC .................................................... 310/58, 64
See application file for complete search history.

(56) References Cited

U.S. PATENT DOCUMENTS

| | | | |
|---|---|---|---|
| 2006/0225358 A1 | 10/2006 | Haag et al. | |
| 2010/0012409 A1* | 1/2010 | Heidenreich | H02K 7/116 |
| | | | 74/473.11 |
| 2010/0013329 A1* | 1/2010 | Heidenreich | H02K 9/19 |
| | | | 310/54 |
| 2020/0129314 A1* | 4/2020 | Herr | A61F 2/72 |

FOREIGN PATENT DOCUMENTS

| | | |
|---|---|---|
| CN | 106716794 B | 5/2017 |
| CN | 108667178 B | 7/2022 |
| DE | 10243273 | 5/2004 |
| DE | 102004033082 | 1/2006 |
| DE | 102010033269 | 2/2012 |
| DE | 102015216233 | 3/2017 |
| DE | 102015216454 | 3/2017 |
| JP | 60-51348 A | 11/1985 |
| JP | 2008-289329 A | 11/2008 |
| JP | 2008295212 A | 12/2008 |
| JP | 2011-142785 A | 7/2011 |
| JP | 2011-142787 A | 7/2011 |
| JP | 2012-231648 A | 11/2012 |
| JP | 2015-027119 A | 2/2015 |

OTHER PUBLICATIONS

Fuchs et al. English Machine Translation of DE 102015216454 (Year: 2015).*

Japanese Office Action issued Jul. 13, 2022 for Japanese Patent Application No. 2021-546375.

* cited by examiner

ELECTRICAL MACHINE WITH A MULTIFUNCTIONAL DISC ELEMENT FOR A ROTOR

CROSS-REFERENCE TO RELATED APPLICATIONS

This application is the U.S. National Phase of PCT Appln. No. PCT/DE2019/101037, filed Dec. 4, 2019, which claims priority to DE 102019103007.2, filed Feb. 7, 2019, the entire disclosures of which are incorporated by reference herein.

TECHNICAL FIELD

The disclosure relates to an electric machine for a motor vehicle drive train, particularly a hybridized drive (hybrid drive) of a motor vehicle, such as a car, truck, bus, or other commercial vehicle.

BACKGROUND

Well-known hybrid drives have relatively powerful electric machines, the efficiency of which is to be increased further. In particular, there is the requirement to reliably detect a position or a speed of the rotor. Furthermore, the rotor should be secured as stably as possible in the assembly thereof. A reliable cooling of the individual components of the electric machine should also be guaranteed in any operating states.

SUMMARY

The object of the disclosure is therefore to provide an efficiently and reliably running electric machine for high-performance applications.

This is achieved by an electric machine with one or more of the features disclosed herein. Accordingly, an electric machine is implemented for a motor vehicle drive train, this electric machine being provided with a stator, a rotor mounted to rotate relative to the stator, and a drive shaft which receives the rotor for conjoint rotation. In an axial direction of the drive shaft next to the rotor there is arranged a disc element made of sheet metal and also connected for conjoint rotation to the drive shaft, wherein the disc element has a transmitter contour that can be detected by an eddy current sensor and a coolant guiding contour for deflecting a coolant stream to the stator, as well as being pressed with an axial prestressing force against an end face of the rotor.

By providing such a disc element, several functions are realized simultaneously with a single component. The result is a particularly powerful electric machine.

Further advantageous embodiments are claimed with the claims and explained in more detail below.

If the transmitter contour has at least one window, preferably several windows arranged in a distributed manner in a circumferential direction, the transmitter contour is provided with a geometry that is particularly easy to manufacture and detect. Furthermore, an eddy current sensor is preferably arranged to be offset relative to the transmitter contour with a certain gap in the axial direction.

With regard to the coolant guiding contour, it is also advantageous if this is formed in a first section by a recess/free space on an (axial) side of the disc element facing the rotor. This significantly reduces the cost of manufacturing the coolant guiding contour.

If the coolant guiding contour is formed in a second section through at least one axial through-hole, preferably a plurality of through-holes distributed in the circumferential direction, the coolant is reliably guided away from the rotor on a radial outside of the coolant guiding contour. The result is the lowest possible fluid resistance for the rotor.

As already mentioned, it is particularly expedient if the second section is provided adjacent to the first section in the radial direction immediately outside the latter.

The stator is expediently arranged with at least one winding radially outside and/or arranged in the axial direction at the same height as an outlet of the coolant guiding contour.

In addition, it is advantageous if at least one contact surface of the disc element that rests axially on the rotor is formed by a deformation/elevation achieved by embossing or deep drawing. As a result, the contour of the disc element is produced in a particularly simple manner.

If a first contact surface delimits the coolant guiding contour radially from the outside, it is used to guide the coolant away from the rotor.

A second contact surface is also implemented with a conical extension/shape when viewed in a dismantled initial state (unassembled state) of the disc element. (The first contact surface is also preferably implemented with such a conical extension/shape and is arranged radially outside the second contact surface.

Accordingly, it is particularly advantageous if the disc element is pressed against the rotor under elastic prestressing by a fastening means supported on the drive shaft, preferably a nut. The resilient property is achieved in particular by the conical extension of the second contact surface. Because it is made from sheet metal, the disc element is also used as a prestressing spring.

Furthermore, it is advantageous if a further disc element, forming a fluid-guiding element, is used on a side of the rotor that is axially remote from the disc element. The fluid-guiding element is implemented in a similar manner, preferably in the same way as the disc element with the exception of the transmitter contour. The fluid-guiding element preferably has two contact surfaces (a first contact surface and a second contact surface) which are realized by deep-drawing technology. The first and/or second contact surface also preferably has a conical shape. The fluid-guiding element also has a coolant guiding contour consisting of a second and a first section.

The respective first section of the coolant guiding contours is then preferably connected to a coolant inlet/coolant feed on a radial inside of the rotor. This coolant feed is preferably at least partially introduced into the drive shaft.

Furthermore, it is expedient if the rotor consists of or has a laminated rotor core, as a result of which the disc element according to the disclosure is used particularly effectively for pressing several metal sheet segments forming the laminated rotor core against one another.

In other words, a multifunctional metal sheet for a rotor of an e-machine (electric machine) is realized according to the disclosure. The multifunction sheet of the rotor of the electric machine has a structure for integrating three different functions, namely the function of a signal transmitter (transmitter contour) of an eddy current sensor, the prevention of a delamination on an outer diameter during operation, and the fluid supply to a stator of the electric machine to achieve cooling.

BRIEF DESCRIPTION OF THE DRAWINGS

In the following, the disclosure is now explained in more detail with reference to figures.

In the figures.

DETAILED DESCRIPTION

The figures are only schematic in nature and serve only for understanding the disclosure. The same elements are provided with the same reference signs.

Figure 1:
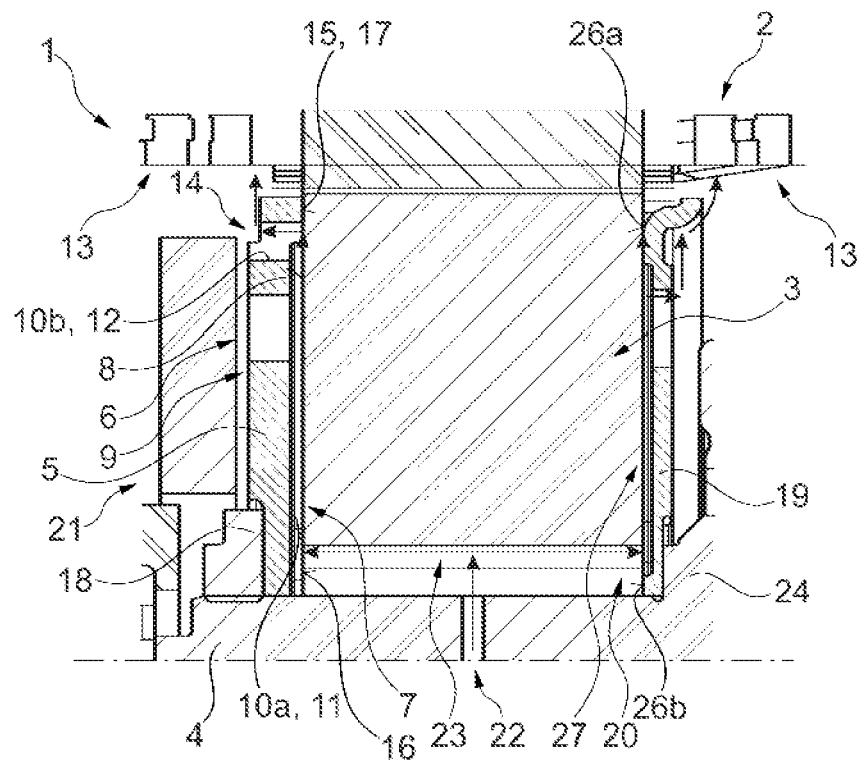
FIG. 1 shows a longitudinal sectional illustration of a partially illustrated electric machine according to a preferred exemplary embodiment, wherein a disc element contacting a rotor of the electric machine is clearly visible.

An electric machine 1 according to the disclosure can be seen particularly well in the basic structure thereof in FIG. 1. In the preferred operating state thereof, the electric machine 1 is used in a hybrid transmission of a motor vehicle drive train, which is not shown here for the sake of clarity. The electric machine 1 is used in a typical manner for support in driving a hybrid vehicle. According to further embodiments, the electric machine 1 can also be used in a purely electrically driven motor vehicle.

The electric machine 1 has a stator 2 that is fixed to the housing. A rotor 3 designed as an internal rotor is rotatably mounted radially inside the stator 2. The rotor 3 is attached for conjoint rotation on a drive shaft 4. The rotor 3 is placed axially from the outside onto the drive shaft 4 and is connected by means of a toothing 20 (serration) which is only indicated in terms of the position thereof in FIG. 1. The drive shaft 4 is further coupled or can be coupled to a transmission shaft of the hybrid transmission during operation.

Figure 2:
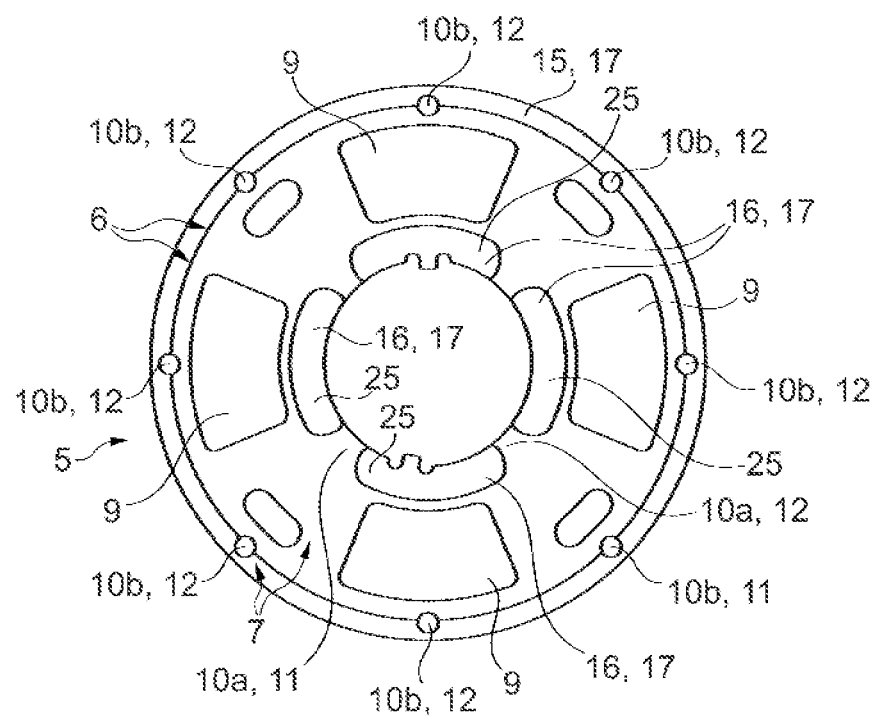
FIG. 2 shows a side of the disc element according to FIG. 1 resting against the rotor during operation.
Figure 3:
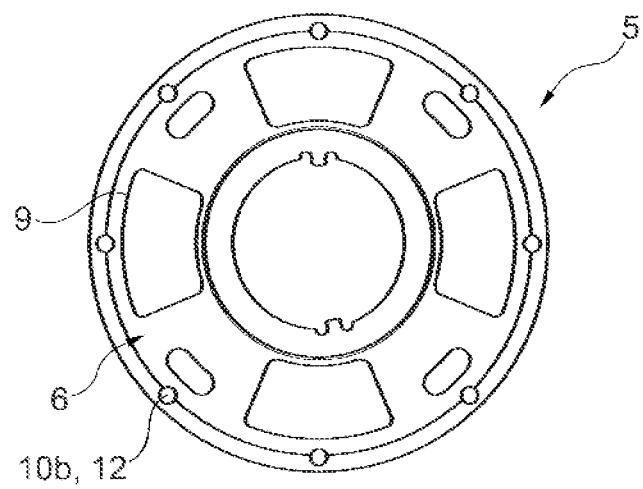
FIG. 3 shows a side of the disc element facing away from the rotor.

To axially secure the rotor 3 relative to the drive shaft 4, a disc element 5 designed according to the disclosure is arranged on a first axial side of the rotor 3. The disc element 5 realizes several functions. The disc element 5 is manufactured as a stamped part. On the one hand, the disc element 5 is designed as a transmitter wheel for a sensor device 21. The disc element 5 therefore has a transmitter contour 6, which transmitter contour 6 is in operative connection with the sensor device 21, which also has an eddy current sensor, not shown here for the sake of clarity. The transmitter contour 6, as can be readily seen in FIGS. 2 and 3, is implemented by several windows 9 evenly distributed in the circumferential direction (window in FIG. 1 only indicated with regard to the radial position thereof). The transmitter contour 6 is designed and interacts with the sensor device 21 during operation in such a way that an angular position/rotational position and more preferably a speed of the rotor 3 can be detected.

As a further function, the disc element 5 is in principle designed in such a way that it is pressed against the rotor 3 with an axial prestressing force. The disc element 5 is implemented entirely as a spring element/spring washer. For this purpose, the disc element 5 has a conical shape. There are two contact surfaces 15, 16 on the disc element 5, which in the axial direction of the drive shaft 4 bear against the rotor 3 on the end face 8 thereof (first axial side). A first contact surface 15 is ring-shaped and runs continuously around the drive shaft 4 in a circumferential direction. A second contact surface 16 is formed radially inside the first contact surface 15 and is subdivided into a plurality of surface segments 25 distributed in the circumferential direction.

Figures 4, 5:
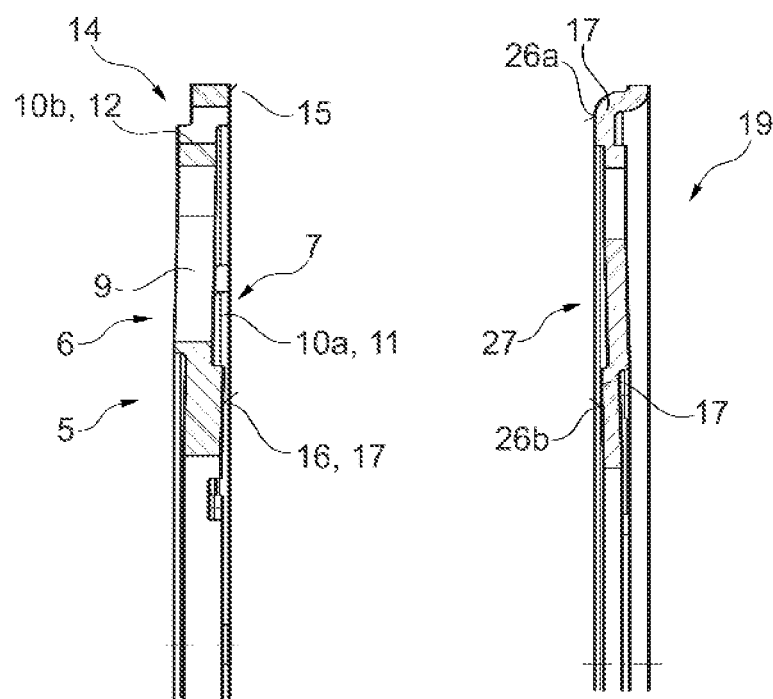
FIG. 4 shows a longitudinal sectional view of the disc element.
FIG. 5 shows a longitudinal sectional view of a fluid-guiding element likewise used in FIG. 1.

Due to the conical extension of the disc element 5, the second contact surface 16 is inclined conically in the unmounted state in relation to a comparison plane oriented to be perpendicular to the drive shaft 4. The first contact surface 15 formed radially outside of the second contact surface 16 is also inclined conically. These conical contact surfaces 15, 16 can also be seen clearly in FIG. 4. During assembly, according to FIG. 1, the second contact surface 16 moves towards the rotor 3 via another path than that for the first contact surface 15. This results in an elastic prestressing of the disc element 5 and an application of a prestressing force which acts directly on the rotor 3. A fastening means 18 implemented as a nut presses the disc element 5 with the second contact surface 16 at the same axial height as the first contact surface 15, so that the rotor 3 is subjected to the prestressing force in the axial direction. The fastening means 18 is fastened directly on the drive shaft 4 on a side of the disc element 5 facing away from the rotor 3, that is to say is screwed on. For the planar contact of the fastening means 18 on the disc element 5, the latter is provided with a flat contact surface, that is to say extending perpendicularly to the drive shaft 4 (by means of turning).

Furthermore, the disc element 5 fulfills the function of a coolant line. For this purpose, the disc element 5 has a coolant guiding contour 7 for deflecting/diverting a coolant stream during operation. A first section 10*a* of the coolant guiding contour 7 runs in the radial direction and is formed by an axial recess 11 (also referred to as a free space) between the rotor 3 and the disc element 5. As can be seen in FIG. 2, there are passages of the coolant guiding contour 7 in the circumferential direction between two embossed deformations 17 representing the surface segments 25, which allow the coolant to flow past them in the radial direction. The first section 10*a* is connected to a feed 22. The first section 10*a* is coupled to the feed 22 in particular via an axially running groove/recess 23 formed between the rotor 3 and the drive shaft 4. On a radial outside of the first section 10*a*, the coolant guiding contour 7 merges directly into a second section 10*b*. The second section 10*b* is realized by a plurality of through-holes 12 distributed in the circumferential direction. The second section 10*b* is delimited directly from the outside in the radial direction by the first contact surface 15. As a result, the coolant flows axially away from the rotor 3 during operation, through the respective through-hole 12. The coolant exits at an outlet 14 of the coolant guiding contour 7 in the axial direction towards the environment in such a way that during operation it is conveyed under the influence of centrifugal force in the radial direction to various windings 13 of the stator 2.

A fluid-guiding element 19 is arranged on a second axial side, i.e., on an axial side of the rotor 3 facing away from the disc element 5. The fluid-guiding element 19, in connection with FIGS. 5 to 7, can be seen in detail and forms a further (second) disc element. The fluid-guiding element 19 is clamped in the axial direction between a radial shoulder 24 of the drive shaft 4 and the rotor 3. The clamping takes place in a typical manner by means of the fastening means 18, which presses the assembly of disc element 5, rotor 3, and fluid-guiding element 19 against shoulder 24. Unless otherwise described below, the structure of the fluid-guiding element 19 is identical to that of the disc element 5.

Figure 6:
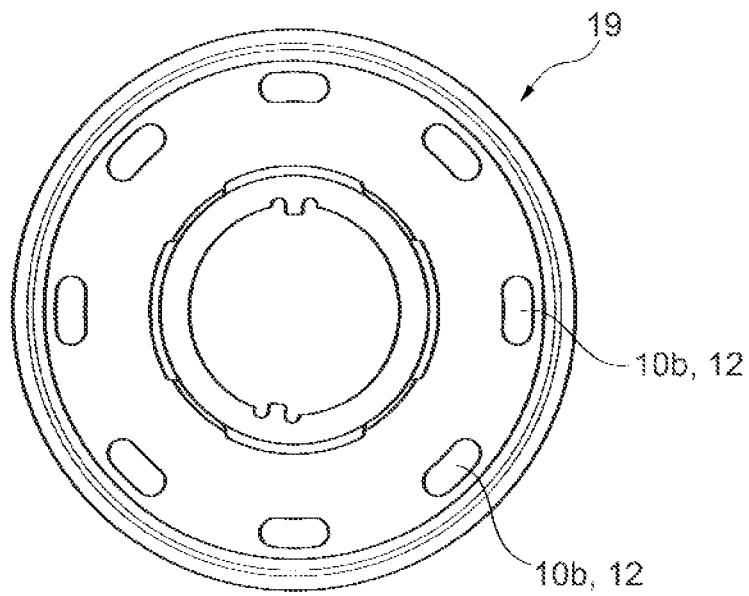
FIG. 6 shows a side of the fluid-guiding element according to FIG. 5 which faces away from the rotor during operation.
Figure 7:
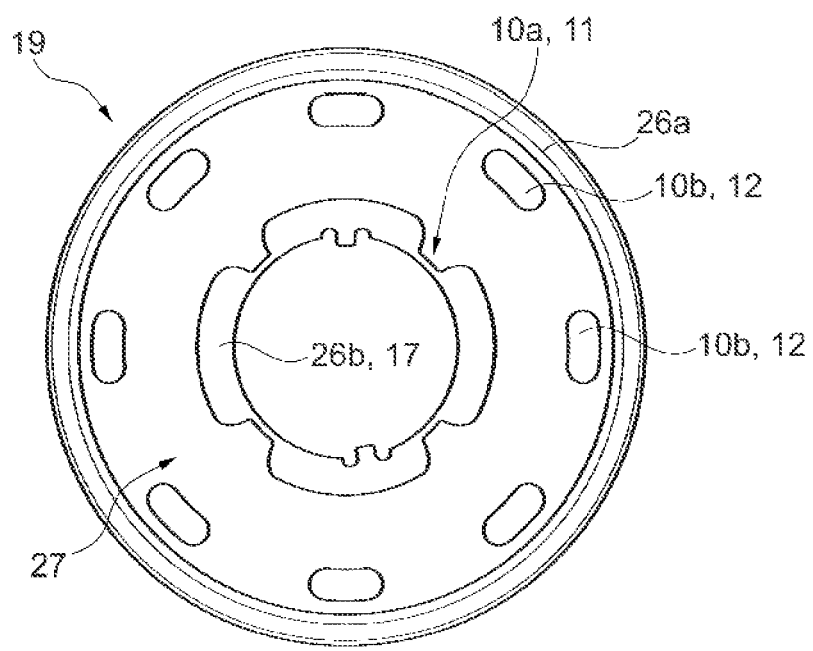
FIG. 7 shows a side of the fluid-guiding element according to FIG. 5 resting against the rotor during operation.

The fluid-guiding element 19 accordingly also has a coolant guiding contour 27, as can be seen in FIGS. 6 and 7. The coolant guiding contour 27 of the fluid-guiding element 19 is provided with a first section 10a, which is further connected to the feed 22. A second section 10b in the form of a through-hole 12 is connected to the first section 10a to divert the coolant to windings 13 of the stator 2.

Two contact surfaces 26a, 26b formed similarly to the contact surfaces 15, 16 of the disc element 5 are realized in this embodiment by means of deep drawing and stamping. The first contact surface 26a formed by a deformation 17 is achieved by deep drawing, while the second contact surface 26b formed by a deformation 17 is achieved by stamping. The width of the fluid-guiding element 19 is smaller than that of the disc element 5. Furthermore, as can be seen from FIG. 5, the fluid-guiding element 19 has a conical extension. Accordingly, in the unassembled state, a second contact surface 26b of the fluid-guiding element 19 is also positioned conically to a comparison plane running perpendicularly to the drive shaft 4. When the contact surfaces 26a, 26b of the fluid-guiding element 19 are pressed against the rotor 3, the fluid-guiding element 19 serves as a prestressing element and accordingly applies a further prestressing force to the rotor 3. In contrast to the disc element 5, however, a transmitter contour 6 is preferably dispensed with.

In other words, the solution according to the invention consists in a special design of a single round metal sheet part (disc element 5). The sheets 5 essentially contain punched windows 9 for the signal transmitter 6, embossments 17 and openings 12 for the oil line and they act as an axial spring for holding the rotor sheets together axially. Viewed in more detail, the sheet metal part 5 is located on the same shaft 4 as the rotor 3 of the electric machine 1. The torque is transmitted through grooves in the shaft 4 and corresponding lugs in the sheet metal part 5 by means of a form fit. A nut 18 clamps the sheet metal part 5 with the rotor 3. The metal sheet 5 thus rotates at the same speed as the rotor 3. The signaling function is implemented by several punched windows 9 in the sheet metal part 5. So as not to negatively influence the signal quality, a certain distance between the signal generator 6 and the rotor 3 is necessary. So that the distance can be maintained, the sheet 5 is embossed inside and outside. The embossments 17 also help with the oil distribution. The oil flows through the shaft 4 and reaches the rotor 3 through four bores evenly distributed around the circumference. The oil is directed to the right and left to the metal sheets 5, 19 through a groove in the rotor 23. The embossments 17 in the sheet 5 locally create a cavity between the rotor 3 and the sheet 5. Centrifugal force guides the oil radially outwards through this cavity. Oil accumulates at the outer diameter and flows out of the metal sheet 5 through several punched holes 12. The centrifugal force ensures that the oil splashes onto the windings 13 of the stators 2. The outflow from the holes 12 ensures that the oil hits the windings 13 at a distance from the air gap of the electric machine 1 of at least a metal sheet thickness. This prevents too much oil from getting into the air gap between stator 2 and rotor 3. A metal sheet 19 is also required on the right-hand side of the rotor 3. This has the same oil guiding function as described above. The difference is that with this sheet 19, the distance to the air gap is smaller due to the thinner sheet thickness. Therefore, the sheet 19 is deep-drawn on the outside diameter. The oil flows out of the openings 12 for the balancing bores. Additional holes for the oil flow are not necessary here, as there is no sensor present to obstruct the oil flow. The signal transmitter function does not apply to this sheet 19, since the rotor position is already determined by the other sheet 5. The third function is to hold the rotor laminations together axially at the outer diameter. After the punching and embossing, both sheets 5, 19 are easily set up/shaped conically. The erected metal sheet 5 is pressed flat against the rotor 3 by the nut 18. The sheet 5 behaves like a spring. This ensures that a force always acts against the rotor 3 at the outer diameter. A delamination is no longer possible. An additional turning operation on the metal sheets 5, 19 ensures a flat contact surface for the nut.

LIST OF REFERENCE SYMBOLS

1 Electric machine
2 Stator
3 Rotor
4 Drive shaft
5 Disc element
6 Transmitter contour
7 Coolant guiding contour
8 Rear face
9 Window
10a First section
10b Second section
11 Recess
12 Through-hole
13 Winding
14 Outlet
15 First contact surface
16 Second contact surface
17 Deformation
18 Fastening means
19 Fluid-guiding element
20 Toothing
21 Sensor device
22 Feed
23 Recess
24 Shoulder
25 Surface segment
26a First contact surface of the fluid-guiding element
26b Second contact surface of the fluid-guiding element
27 Coolant guiding contour of the fluid-guiding element

The invention claimed is:

1. An electric machine for a motor vehicle drive train, the electric machine comprising:
   a stator;
   a rotor mounted to rotate relative to the stator;
   a drive shaft receiving the rotor for conjoint rotation therewith;
   a disk element made of sheet metal and also connected for conjoint rotation to the drive shaft arranged in an axial direction of the drive shaft next to the rotor, the disk element having a transmitter contour that is detectable by an eddy current sensor and a coolant guiding contour configured to deflect a coolant stream to the stator and being pressed with an axial prestressing force against an end face of the rotor.

2. The electric machine according to claim 1, wherein the transmitter contour has at least one window.

3. The electric machine according to claim 1, wherein the coolant guiding contour is formed in a first section by a recess on a side of the disk element facing the rotor.

4. The electric machine according to claim 3, wherein the coolant guiding contour is formed in a second section by at least one axial through-hole.

5. The electric machine according to claim 1, wherein the stator is arranged with at least one winding radially outside an outlet of the coolant guiding contour.

6. The electric machine according to claim 1, wherein at least one contact surface of the disk element that rests axially on the rotor is formed by an embossed or deep-drawn deformation.

7. The electric machine according to claim 6, a first of the at least one contact surface delimits the coolant guiding contour radially from outside.

8. The electric machine according to claim 7, wherein a second of the at least one contact surface has a conical extension when viewed in an initial, pre-installed state of the disk element.

9. The electric machine according to claim 1, wherein the disk element is pressed against the rotor under elastic prestressing by a fastener supported on the drive shaft.

10. The electric machine according to claim 1, further comprising a fluid-guiding element arranged on a side of the rotor that is axially remote from the disk element.

11. An electric machine for a motor vehicle drive train, the electric machine comprising:
   a stator;
   a rotor mounted to rotate relative to the stator;
   a drive shaft receiving the rotor for conjoint rotation therewith;
   a disk element made of sheet metal and also connected for conjoint rotation to the drive shaft arranged in an axial direction of the drive shaft next to the rotor, the disk element having a transmitter contour that is detectable by an eddy current sensor and a coolant guiding contour configured to deflect a coolant stream to the stator and being pressed with an axial prestressing force against an end face of the rotor; and
   a fluid-guiding element arranged on a side of the rotor axially remote from the disk element, the fluid-guiding element comprising a sheet metal disk with a deep-drawn outside diameter, having a coolant guiding contour on a side facing the rotor, and balancing bores adapted to allow a coolant flow therethrough to an opposite side of the disk.

12. An electric machine for a motor vehicle drive train, the electric machine comprising:
   a stator;
   a rotor mounted to rotate relative to the stator;
   a drive shaft receiving the rotor for conjoint rotation therewith;
   a disk element made of sheet metal and also connected for conjoint rotation to the drive shaft arranged in an axial direction of the drive shaft next to the rotor, the disk element having a transmitter contour that is detectable by an eddy current sensor and a coolant guiding contour facing the rotor configured to deflect a coolant stream to the stator and being pressed with an axial prestressing force against an end face of the rotor.

13. The electric machine according to claim 12, wherein the transmitter contour has at least one window.

14. The electric machine according to claim 12, wherein the coolant guiding contour is formed in a first section by a radially extending recess on a side of the disk element facing the rotor.

15. The electric machine according to claim 14, wherein the coolant guiding contour includes a second section formed by at least one axial through-hole.

16. The electric machine according to claim 12, wherein the stator is arranged with at least one winding radially outside an outlet of the coolant guiding contour.

17. The electric machine according to claim 12, wherein at least one contact surface of the disk element that rests axially on the rotor is formed by an embossed or deep-drawn deformation.

18. The electric machine according to claim 17, wherein a first of the at least one contact surface delimits the coolant guiding contour radially from outside.

19. The electric machine according to claim 18, wherein a second of the at least one contact surface has a conical extension when viewed in an initial, pre-installed state of the disk element.

20. The electric machine according to claim 12, wherein the disk element is pressed against the rotor under elastic prestressing by a fastener supported on the drive shaft.

\* \* \* \* \*